J. W. COOPER.
NEST BOX.
APPLICATION FILED APR. 28, 1917.
1,243,591.
Patented Oct. 16, 1917.
2 SHEETS—SHEET 1.
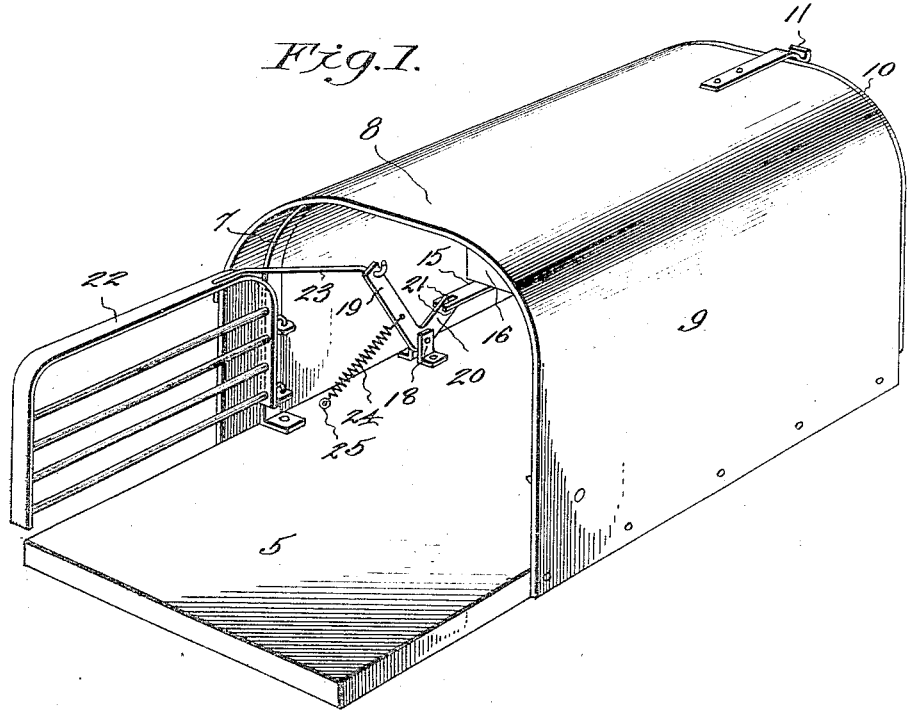
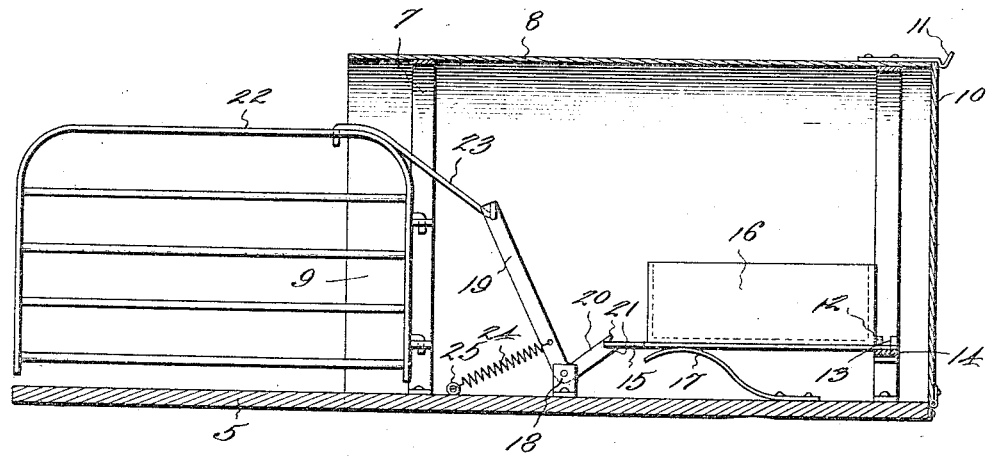
WITNESSES
INVENTOR
J. W. Cooper,
BY Victor J. Evans
ATTORNEY J. W. COOPER.
NEST BOX.
APPLICATION FILED APR. 28, 1917.
1,243,591.
Patented Oct. 16, 1917.
2 SHEETS—SHEET 2.
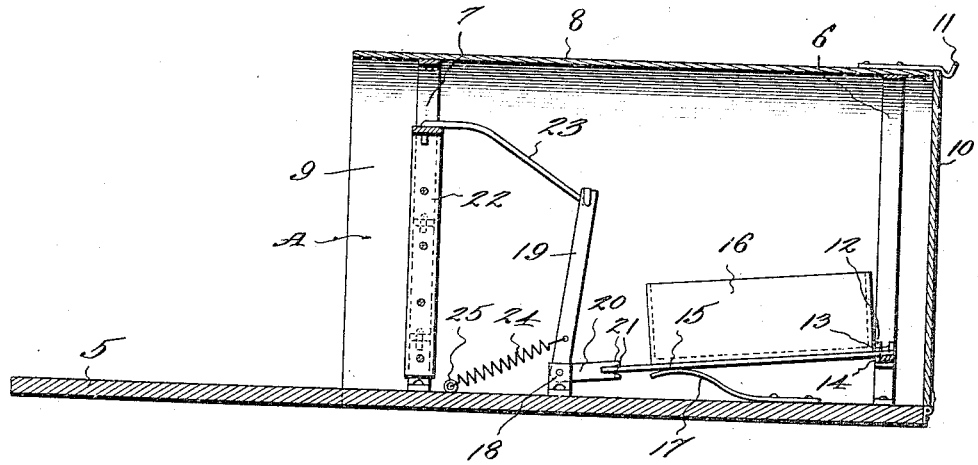
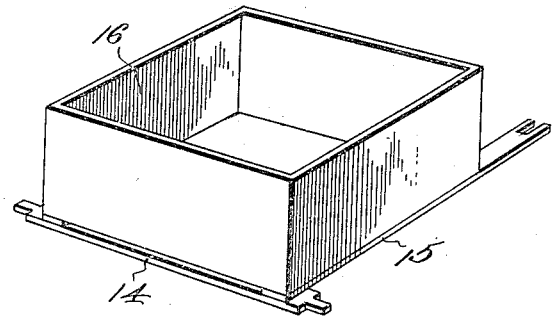
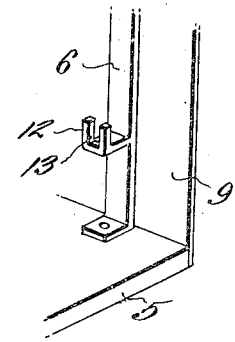
WITNESSES
INVENTOR
J. W. Cooper,
BY Victor J. Evans
ATTORNEY

UNITED STATES PATENT OFFICE.

JAMES W. COOPER, OF MARSHALLTOWN, IOWA.

NEST-BOX.

1,243,591. Specification of Letters Patent. Patented Oct. 16, 1917.

Application filed April 28, 1917. Serial No. 165,229.

*To all whom it may concern:*

Be it known that I, JAMES W. COOPER, a citizen of the United States, residing at Marshalltown, in the county of Marshall and State of Iowa, have invented new and useful Improvements in Nest-Boxes, of which the following is a specification.

This invention relates to a nest box which is especially adapted for the use of fowls such as chickens and the like.

The primary object of the invention is to provide a nest box of this character the construction of which is such as to prevent more than one fowl occupying a nest therein at one time although the occupant of the nest may enter and leave the box at will.

Another object of the invention is to provide a nest box in which supports serving to connect a cover with the base of the box are so constructed that they may serve as supports for a gate and a nest tray.

A further object of the invention is to provide a nest box in which a nest tray and a gate for closing one end of the box are connected with mechanism of novel construction which permits the operation of the gate under the influence of the weight of a fowl entering or leaving the nest within the nest tray.

With these and other objects in view the invention resides in the novel combination and arrangement of parts which will be hereinafter described and particularly pointed out in the claim.

The preferred embodiment of the invention has been illustrated upon the accompanying drawings, although no restriction is necessarily made to the precise details of construction therein shown, as changes, and alterations within the scope of the appended claim may be resorted to when desired.

In the drawings:

Figure 1 is a perspective view of a nest box constructed in accordance with the invention, Fig. 2 is a vertical longitudinal sectional view therethrough, Fig. 3 is a section similar to Fig. 2 the gate associated with the box being shown in closed position, and Fig. 4 is a detail perspective view of the nest tray.

Fig. 5 is a detail perspective view of a portion of a nest box.

Like characters of reference denote corresponding parts throughout the various views in the drawings.

Referring now to the drawings in detail the letter A designates a nest box constructed in accordance with the invention and in which a rectangular shaped base 5 has mounted thereon spaced and inverted U-shape supports 6 and 7 having connected therewith and with the base a domed shape cover 8, the cover and base co-acting to provide an open ended casing 9, one end of which is adapted to be closed by a lid 10 hingedly connected with the base and engaged by a spring latch 11 on the cover 8.

Each arm of the support 6 has extending laterally therefrom an extension 12 in which is formed bearing openings 13 receiving therein the trunnions at the ends of a cross bar 14 of a U-shaped frame 15 to which is secured a nest tray 16. A leaf spring 17 which serves to support the nest tray 16 in a horizontal position within the casing 9 has one end thereof secured to the base 5 and its other end bearing against one arm of the frame 15, the other arm of which extends beyond the forward end of the nest tray and is notched as shown.

A bracket 18 is secured to the base 5 in advance of the nest tray and has fulcrumed thereon a vertically extending bell crank lever 19, the shorter arm 20 of which extends toward the nest tray and is forked to provide fingers 21 receiving therebetween the notched end of the longer arm of the frame 15.

A gate 22 for closing the outer end of the casing 9 is hingedly connected with one of the arms of the support 7 and has connected therewith a link 23 also having connection with the longer arm of the bell crank lever 19 with which is connected a coiled contractile spring 24 having its other end secured to an eye 25 on the base 5, said spring normally maintaining the bell crank lever in such position as to cause the link 23 to hold the gate in open position.

When a fowl enters the casing 9 and attempts to occupy a nest placed within the tray 16 the weight of the fowl acts in opposition to the springs 17 and 24 and tilts the nest tray to the position shown in Fig. 3 in the drawings, such tilting movement of the tray operating the bell crank lever 19 and causing the link connected therewith to swing the gate 22 to closed position, thus preventing more than one fowl occupying the nest at one time.

When the occupant of the nest leaves the same the springs 17 and 24 restore the nest tray and bell crank lever to their normal position, thus causing the gate to be swung to and maintained in an open position until the nest within the tray is again occupied.

The lid 10 permits access to be had to the nest in the tray 16 for the removal of eggs therefrom while by connecting the nest tray with the extensions 12 as described the nest and tray may be disconnected therefrom when it is desired to rid the tray of vermin and the like.

From the foregoing description taken in connection with the accompanying drawing it is at once apparent that a nest box has been provided which is comparatively inexpensive of manufacture although strong and durable in use.

Having thus described the invention, what is claimed as new, is:

In a device of the class described, a base, a cover for connection with said base, spaced and inverted U-shaped supports on said base connecting said cover therewith, a gate hingedly connected with one of said supports, extensions on the other of said supports having bearing openings therein, a frame interposed between said extensions and having trunnions thereon extending within said bearing openings, a nest tray carried by said frame, and means for connecting said frame with the gate.

In testimony whereof I affix my signature.

JAMES W. COOPER.

Copies of this patent may be obtained for five cents each, by addressing the "Commissioner of Patents, Washington, D. C."